United States Patent [19]

Davis

[11] Patent Number: 4,464,434

[45] Date of Patent: Aug. 7, 1984

[54] MICROENCAPSULATED ALKALOIDAL MATERIAL AND METHOD OF PRODUCING SAME

[75] Inventor: Danny A. Davis, Casstown, Ohio

[73] Assignee: Celanese Corporation, New York, N.Y.

[21] Appl. No.: 885,914

[22] Filed: Mar. 13, 1978

[51] Int. Cl.³ .................... B01J 13/02; A01N 25/28
[52] U.S. Cl. ................... 428/402.22; 131/352;
131/369; 264/4.3; 424/19; 424/33; 424/35;
424/197; 424/264; 426/89; 427/213.33;
428/402.24
[58] Field of Search .......... 252/316; 131/10.1, 261 A,
131/352, 369; 424/33, 197, 264; 264/4.3;
427/213.33; 428/402.22, 402.24

[56] References Cited

U.S. PATENT DOCUMENTS

| | | | |
|---|---|---|---|
| 2,343,360 | 3/1944 | Arnold | 424/197 |
| 2,431,672 | 12/1947 | Arnold | 424/197 |
| 3,460,972 | 8/1969 | Nack | 252/316 X |
| 3,674,704 | 7/1972 | Bayless et al. | 252/316 |
| 3,748,277 | 7/1973 | Wagner | 252/316 |
| 3,931,824 | 1/1976 | Miano et al. | 131/17 R X |

FOREIGN PATENT DOCUMENTS

| | | | |
|---|---|---|---|
| 2017356 | 1/1972 | Fed. Rep. of Germany | 424/264 |
| 929403 | 6/1963 | United Kingdom. | |
| 930421 | 7/1963 | United Kingdom. | |
| 1095848 | 12/1967 | United Kingdom. | |
| 1171043 | 11/1969 | United Kingdom. | |
| 1318799 | 5/1973 | United Kingdom. | |
| 1334658 | 10/1973 | United Kingdom. | |
| 1349537 | 4/1974 | United Kingdom. | |
| 1389238 | 4/1975 | United Kingdom. | |
| 1482663 | 8/1977 | United Kingdom. | |
| 1528419 | 10/1978 | United Kingdom. | |

*Primary Examiner*—Richard D. Lovering
*Attorney, Agent, or Firm*—Robert J. Blanke; Andrew F. Sayko, Jr.

[57] ABSTRACT

Microcapsules having a core of an alkaloidal material surrounded by a protective cross-linked polymeric wall are disclosed. The microcapsules are produced by intermixing a polymeric wall material with a liquid vehicle to form a solution thereof as a continuous first phase, and mixing the solution with an alkaloidal material. The produced admixture is agitated to disperse the alkaloidal material as a plurality of discrete minute core material entities in the first phase, and thereafter, phase separation is induced to separate the polymeric wall material from the liquid vehicle so that the wall material forms embryonic sheaths about the core material entities. The polymeric wall material is then cross-linked to form protective walls around each of the core material entities.

42 Claims, No Drawings

MICROENCAPSULATED ALKALOIDAL MATERIAL AND METHOD OF PRODUCING SAME

BACKGROUND OF THE INVENTION

This invention relates to alkaloid-containing microcapsules and a method for producing such microcapsules.

The recently expressed concern about the effects of the combustion byproducts of cigarette smoke on smokers has created a demand for products which may be substituted for tobacco. Optimally, a successful tobacco substitute product should yield smoke which has a substantially lower amount of undesirable components than tobacco smoke, and provide a flavor impact and combustion rate that is acceptably similar to that of tobacco.

One example of a substitute for tobacco is disclosed in U.S. Pat. No. 3,931,824 to Miano et al. The Miano et al. tobacco substitute is basically made up of combustible organic materials, such as cellulose derivatives, and a non-combustible filler material. Additional flavor impact and odor properties of the Miano et al. tobacco substitute are provided by inclusion of a wide variety of additives, such as tobacco extracts, fruit extracts, and various flavorants. In addition, it is disclosed that nicotine and other alkaloid products may be added in controlled amounts.

It is desirable to include nicotine in tobacco substitutes such as those disclosed in the Miano et al. patent, in order to increase the similarity of the flavor impact of the substitute product to that of tobacco. However, because tobacco alkaloids such as nicotine are readily volatile when isolated from tobacco, it has been difficult, if not commercially impractical, to produce a commercially satisfactory tobacco substitute product containing nicotine. For example, in order to handle the tobacco alkaloids in the manufacturing process, safety precautions, such as expensive exhaust and monitoring equipment, would be needed to insure that the tobacco alkaloid vapors in the manufacturing plant would remain at a sufficiently low level. And, in addition to problems encountered in incorporating tobacco alkaloids into tobacco-substitute products, the shelf life of tobacco alkaloid-containing substitute products may not be of a sufficient duration for these products to be commercially practical, due to the relatively rapid rate of volatilization of the tobacco alkaloids.

It has now been found that the manufacturing and packaging difficulties encountered in incorporating tobacco alkaloids into substitute products can be obviated by microencapsulating the tobacco alkaloids and incorporating the produced microcapsules into the substitute product. While many different microencapsulation techniques are known, prior to the present invention it was not possible to microencapsulate tobacco alkaloids using any of the known techniques.

Of the many different microencapsulation processes which are known in the art, processes which utilize liquid-liquid phase separation to provide a material capable of encapsulating liquid core entities appeared to be the more likely processes for forming microcapsules containing a tobacco alkaloid. Generally, such microencapsulation processes, utilizing liquid-liquid phase separation, are carried out by first forming an agitated system which includes (a) a continuous liquid vehicle such as toluene, (b) a dispersion of individual entities of the material to be encapsulated, i.e., the capsule core material which may either be solid particles or droplets of a solution immiscible with liquid vehicle, and (c) a wall forming material in solution in the continuous liquid vehicle. Next, phase separation of the wall forming material from the liquid vehicle is induced, and the wall forming material envelops the capsule core entities to form microcapsules. Finally the capsule wall material is hardened in some manner. Typical such processes are disclosed in U.S. Pat. No. 3,155,590 to Miller et al., U.S. Pat. No. 3,415,758 to Powell et al., U.S. Pat. No. 3,748,277 to Wagner et al., and U.S. Pat. No. 3,674,704 to Bayless et al.

However, tobacco alkaloids are too soluble in a wide variety of organic and inorganic liquids and, as a practical matter, cannot be maintained in only one liquid phase for microencapsulation according to the prior art processes.

SUMMARY OF THE INVENTION

The present invention provides alkaloidal material-containing microcapsules having a core material containing an alkaloidal material. The core material is encapsulated by a wall of relatively water-impermeable, usually cross-linked, polymeric material which surrounds the core material.

The microcapsules of the present invention can be produced by intermixing, inter alia, (a) a polymeric wall material, (b) a water-immiscible liquid vehicle capable of dissolving the polymeric wall material, and (c) an aqueous vehicle, immiscible with the liquid vehicle and carrying an alkaloidal material substantially insoluble in the liquid vehicle, the aqueous vehicle being capable of dispersion in the liquid vehicle as a plurality of minute individual entities. The produced admixture is agitated to disperse the alkaloidal material-carrying aqueous vehicle as individual, minute core material entities throughout the liquid vehicle in which the polymeric wall material is dissolved and to form an agitated system in which the liquid vehicle constitutes a continuous first phase. The dissolved polymeric wall material is separated from the continuous first phase of the agitated system by inducing liquid-liquid phase separation. As a result, sheaths of the wall material are formed about the minute core material entities The polymeric wall material in the sheaths is then hardened, usually by cross-linking, to form protective walls around the minute core material entities.

DETAILED DESCRIPTION

Microcapsules produced in accordance with the present invention have a core material carrying an alkaloidal material. Preferably, the alkaloidal material is carried in an aqueous vehicle. The core material is encapsulated by a wall of a relatively water-impermeable polymeric material. Such microcapsules are useful as additives to smoking materials, and are also useful, per se, as extended-action pesticides, feed supplements, and the like.

Alkaloidal materials which may be included in the core material of microcapsules of the present invention include alkaloids, and in particular the tobacco alkaloids such as nicotine, nornicotine, or anabasine, and their derivatives, all of which materials are well known in the art, in a form that is substantially insoluble in the liquid vehicle used for microencapsulation. Although the core material may comprise a suspension of the alkaloidal materials, aqueous solutions of such alkaloidal materials or derivatives thereof are preferred.

The tobacco alkaloids are nitrogenous bases, and can exist in the non-protonated or free base form, or in the protonated or acid addition salt form. For the purposes of the present invention, the tobacco alkaloids are preferably used in the form of water-soluble derivatives, such as acid addition salts, that are substantially insoluble, i.e., only sparingly soluble, in the organic liquid vehicle, and preferably insoluble in this vehicle. Suitable water-soluble derivatives of tobacco alkaloids include the water-soluble acid addition salts thereof formed with a physiologically acceptable organic or inorganic acid.

Especially preferred aqueous core materials for use in microcapsules intended as additives to tobacco substitute smoking materials are aqueous solutions of a tobacco alkaloid acid addition salt of a relatively strong acid having a relatively low equivalent weight. For this purpose, preferred are organic or inorganic acids having at least one pK value of about 5 or less, more preferably having at least one pK value in the range of about 2 to about 4. Illustrative such acids are citric acid ($pK_1=3.08$, $pK_2=4.74$, $pK_3=5.40$), orthophosphoric acid ($pK_1=2.12$, $pK_2=7.21$, $pK_3=12.67$), phosphorous acid ($pK_1=2.00$, $pK_2=6.59$), pyrophosphoric acid ($pK_1=0.85$, $pK_2=1.49$, $pK_3=5.77$, $pK_4=8.22$), malic acid ($pK_1=3.40$, $pK_2=5.11$), d-tartaric acid ($pK_1=2.98$, $pK_2=4.34$), and the like.

In order to prolong the retention of nicotine in the microcapsule, in addition to the nicotine acid addition salt it is preferred to have in the core material an excess of the corresponding acid. In particular, the presence of the corresponding acid in an amount of about 0.1 percent to about 100 percent by weight in excess of the stoichiometric requirement for formation of the acid addition salt has been found to be especially desirable.

The wall of the microcapsule is a relatively water-impermeable, polymeric material which completely surrounds, and thus encapsulates, the core material. For microcapsules which are to be used as additives in tobacco-substitute materials, the wall material must be capable of releasing the alkaloid (e.g., by diffusion, by rupturing or burning of the microcapsule wall) at the temperatures generated in such tobacco-substitute materials when they are smouldering. A suitable wall material for such use is a cross-linked polymer, preferably a previously partially hydrolyzed ethylene-vinyl acetate copolymer.

For some end uses, such as pesticides, it is desirable that the wall of the microcapsules be semi-permeable to the encapsulated core material so as to allow the alkaloid contained therein to slowly escape in a controlled manner from the capsules after the microcapsules have been dispersed over the acreage which is intended to be treated. This semi-permeability could be facilitated by mixing relatively non-permeable microcapsules with a solution which tends to break down the wall of the microcapsules immediately prior to use. Alternatively, the wall of such microcapsules may be rendered relatively permeable by only partially cross-linking the polymeric wall material. For some applications it may not be necessary to cross-link the wall material at all. In such instances the microcapsule wall can be hardened by drying.

Alkaloidal material-containing microcapsules can be produced by intermixing, inter alia, (a) a polymeric wall material, (b) a water-immiscible liquid vehicle capable of dissolving the polymeric wall material, and (c) an aqueous vehicle, immiscible with the liquid vehicle and carrying an alkaloidal material substantially insoluble in the liquid vehicle, capable of being dispersed in said liquid vehicle as a plurality of individual minute core material entities. The produced mixture is agitated to disperse the alkaloidal-material carrying aqueous vehicle as individual, minute core material entities throughout the liquid vehicle to form an agitated system in which the liquid vehicle constitutes the major component of the system. The polymeric wall material is dissolved in the liquid vehicle. Next, phase separation is induced within the agitated system to separate the wall material from the liquid vehicle and to form embryonic sheaths of the wall material about the core material entities. Finally, the wall material in the embryonic sheaths is cross-linked to form protective walls around the capsule core material entities.

A preferred process for encapsulating tobacco alkaloids, such as nicotine, anabasine, nornicotine, and the like, includes first forming an aqueous vehicle carrying a tobacco alkaloid. Preferably, this is done by forming a water-soluble derivative of the tobacco alkaloid in an aqueous solution. The tobacco alkaloid-carrying aqueous vehicle is then subjected to a microencapsulation process which is of the liquid-liquid phase separation type, utilizing an organic liquid vehicle, an aqueous core material which is an acid addition salt of an alkaloid, and as the wall-forming material a partially-hydrolyzed ethylene-vinyl acetate copolymer. The microcapsule wall formed by this process is subsequently hardened.

Acid addition salts of the tobacco alkaloids can be prepared by the neutralization of the alkaloid in its free base form with an appropriate amount of an organic or inorganic acid. Examples of such acids include acetic, lactic, salicylic, glycolic, succinic, tartaric, maleic, malic, palmitic, protocatechuic, citric, ortho-phosphoric, phosphorous, pyrophosphoric, methanesulfonic acids, and the like. The neutralization can be carried out by a variety of procedures known to the art to be generally useful for the preparation of acid addition salts. The choice of the most suitable procedure will depend on a variety of factors including convenience of operation, economic considerations, and particularly the solubility characteristics of the particular free base, the acid, and the acid addition salt. If the acid is soluble in water, the free base can be dissolved in water containing an equivalent amount of the acid, and, if desired, after reaction, the water can be removed by evaporation. In some instances, the salt precipitates from the aqueous solution, particularly when cooled. If the acid is soluble in a relatively non-polar solvent, such as diethyl ether or diisopropyl ether, separate solutions of the acid and free base in such a solvent can be mixed in equivalent amounts, whereupon the acid addition salt will usually precipitate because of its relatively low solubility in the non-polar solvent. Alternatively, the free base can be mixed with an equivalent amount of the acid in the presence of a solvent of moderate polarity, such as a lower alkanol, a lower alkanone, or a lower-alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. The acid addition salts produced in the foregoing manner can then be dissolved in water in an amount necessary to provide the desired tobacco alkaloid content in the microcapsule.

To assure adequate partition of the alkaloid acid addition salt away from the organic liquid vehicle and for minimal alkaloid release from the produced microcapsules during subsequent handling and processing into smoking articles, it is preferred that the aqueous, alkaloid-containing core material that is to be encapsulated contain an excess of the acid used to protonate the alkaloid. Preferably, the amount of acid should exceed the stoichiometric amount needed for formation of the acid addition salt by at least about 0.1 percent, and more preferably by at least about 10 percent by weight.

The concentration of the solutes in the aqueous solution during encapsulation is also important. Preferably the amount of water present should exceed the amount needed for a completely saturated solution by about 20 percent by weight.

The capsule wall material can be any film-forming polymeric material that wets the core material. The capsule wall material preferably is a partially hydrolyzed poly(ethylene-vinyl acetate) copolymer in which some of the vinyl acetate groups are hydrolyzed to form vinyl alcohol groups in order to provide reaction sites for subsequent cross-linking. The degree of hydrolysis for the poly(ethylene-vinyl acetate) wall-forming material can be within the relatively broad range of about 15 percent to about 70 percent. Thus, the partially hydrolyzed copolymers of ethylene and vinyl acetate contain ethylene groups, vinyl acetate groups, and vinyl alcohol groups, and can be represented by the general formula

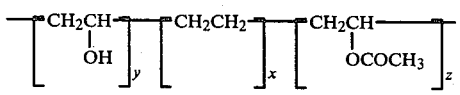

wherein x, y, and z represent mol fractions of ethylene, vinyl alcohol, and vinyl acetate, respectively. With respect to the degree of hydrolysis, the mol ratio of the vinyl alcohol groups to the sum of vinyl alcohol groups and the vinyl acetate groups present is about 0.15 to about 0.7. The amount of ethylene groups present is also important and can be about 60 to about 88 mol percent, or stated in another way, the mol ratio of ethylene groups to the sum of ethylene groups, vinyl alcohol groups and vinyl acetate groups can be about 0.6 to about 0.88. The partially-hydrolyzed poly(ethylene-vinyl acetate) suitable for practicing the present invention preferably has a molecular weight of the order of about 50,000 and a melt index (using a 2160 gram force at 190° C. for 10 minutes) of about 2 to about 100, more preferably a melt index of about 5 to about 50. The molecular weight of the copolymer is not overly critical, except that if the molecular weight is too high the copolymer will be relatively insoluble in the liquid vehicle that forms a major portion of the encapsulation system and if the molecular weight is too low, it may be difficult to induce phase separation during encapsulation. Other suitable polymeric wall materials are the poly(vinyl-formal) polymers, poly(vinyl-butyral) polymers, alkylated celluloses (e.g., ethyl cellulose), acylated celluloses (e.g., cellulose acetate butyrate), and the like.

Typical illustrative water-immiscible liquids which can serve as liquid vehicles for the presently contemplated process are solvents for the polymeric wall material and include the liquid aromatic hydrocarbons such as xylene and the like, as well as the liquid halogenated hydrocarbons such as methyl chloride and the like. Also suitable are solvents such as cyclohexane, cyclohexanol, methyl isobutyl ketone, ethylene glycol monobutyl ether, 1-methyl-2-pyrrolidone, pyridine, butanol, and the like.

Suitable phase separation-inducing materials for the present purposes are polymeric materials that are soluble in the liquid vehicle and that exhibit in the system less affinity for the capsule core material entities than does the polymeric wall material, thereby causing the latter to deposit preferentially around the dispersed core material entities. In other words, the phase separation-inducing material is incompatible with the polymeric wall material. Illustrative phase separation-inducing materials of this type are polymeric materials such as silicone oils, e.g., polydimethyl siloxane, and the like; polyolefins, e.g., polybutadiene having a molecular weight of about 8,000 to about 10,000, polybutene having a molecular weight of about 330 to about 780; unhydrolyzed ethylene-vinyl acetate copolymers; natural waxes; and the like. Polymeric materials of this general type are sometimes characterized in the art as "complementary polymeric materials."

Another type of phase separation-inducing material that can be utilized to initially form the embryonic microcapsule wall is a non-polymeric liquid that is a non-solvent for the polymeric base material and the capsule core material but is miscible with the liquid vehicle. Illustrative phase separation-inducing materials of the non-solvent type are the vegetable oils, e.g., the semi-drying oils such as cottonseed oil or corn oil, and the drying oils such as linseed oil, soybean oil, and the like. Other illustrative materials of the non-solvent type are mineral oils, halogenated mineral oils, liquid saturated alicyclic hydrocarbons such as cyclohexane, cycloheptane, and the like, liquid saturated straight-chain aliphatic hydrocarbons such as n-hexane, n-heptane, and the like.

To bring about the phase separation and the attendant sheath or embryonic microcapsule wall formation, the wall-forming material, the phase separation-inducing material, and the solvent which serves as the liquid vehicle of the system can be combined in any convenient sequence. Preferably, a dilute solution of the wall-forming material is formed first, and the liquid-liquid phase separation is then effected by the addition of the phase separation-inducing material at an elevated temperature of about 30° C. or higher; however, the order of addition can be reversed, or both the wall-forming material and the phase separation-inducing material can be combined with the liquid vehicle simultaneously.

The quantitative relationships of the wall-forming material and the phase separation-inducing material depend on the particular materials that are used and also on the thickness of the protective wall desired for the capsule core material. In general, the wall-forming material constitutes about 0.5 to about 5 percent (preferably about 1 to about 2 percent) of the total system volume, the phase separation-inducing material constitutes about 0.5 to about 25 percent (preferably about 8 to about 12 percent) of the total system volume, and the discrete capsule core material entities constitute about 2 to about 30 percent (preferably about 15 to about 25 percent) of the total system volume.

Alternatively, phase-separation can be induced within the system by first forming a solution of the polymeric wall material (i.e., the microcapsule wall-forming material) in the liquid vehicle at a predetermined dissolution temperature and thereafter changing the temperature of the resulting solution by heating or cooling to an insolubility temperature for at least a portion of the dissolved polymeric wall material. Usually the solution temperature is lowered by at least about 10° C. to effect the embryonic microcapsule wall formation about the capsule core material entities dispersed in the solution; however, in instances where the solubility of the polymeric wall material in the liquid vehicle decreases with increasing temperature, phase separation is induced by elevating the temperature of the polymeric wall material solution.

A combination of the aforementioned phase separation inducing techniques can also be employed.

Suitable cross-linking agents useful for hardening the microcapsules according to the present invention include the diisocyanates or polyisocyanates, e.g., toluene diisocyanate, with or without a catalyst present. Particularly preferred is a toluene diisocyanate-trimethylol propane adduct, usually dissolved in an aliquot of the liquid vehicle. Also suitable as cross-linking agents are the diacid halides such as malonyl chloride, oxalyl chloride, sulfonyl chloride, thionyl chloride, and the like. Yet another grouping of suitable hardening agents is illustrated by the alkali alkoxides such as the sodium, potassium, lithium and cesium methoxides, ethoxides, propoxides, and the like.

To effect the desired chemical hardening of the formed sheath, and thereby provide the protective capsule wall, the cross-linking or hardening agent can be dissolved in an aliquot of the liquid vehicle or another compatible solvent and then added to the suspension of sheathed capsule core material entities. Cross-linking can then be carried out at a temperature of about 0° C. to about 50° C. for a time period of about 5 minutes to about 20 hours, depending on the cross-linking agent that is used. The cross-linking time period when using the acid halides can be about 5 to about 15 minutes, and when using the diisocyanates can be about 5 to about 15 hours, depending on reaction conditions.

The microcapsule sheath can also be hardened, i.e., cross-linked, by exposing the sheath to high energy ionizing radiation such as accelerated electrons, X-rays, gamma rays, alpha particles, neutrons, and the like.

Permeability of the produced protective wall of the microcapsules is dependent to a considerable extent on the degree of cross-linking that has been effected, and can be built into the protective wall as desired for a given end use by controlling the degree of cross-linking that takes place.

Microcapsules having a considerable size range can be manufactured when practicing the present invention. Microcapsule size can extend from an average diameter of about one micron and less to about several thousand microns and more. The usual size for the produced microcapsules is about 1 micron to about 1500 microns in average diameter, and is generally in the range of about 5 microns to about 500 microns. Similarly, the microcapsules can be manufactured containing varying amounts of core material which can constitute up to about 99 percent or more of the total weight of each microcapsule. Preferably the core material constitutes about 50 to about 97 percent of the total weight of each microcapsule.

To carry out an illustrative microencapsulation process, a solution of a liquid vehicle such as toluene and a wall material comprising partially hydrolyzed ethylene-vinyl acetate copolymer (HEVA), having from about 15 percent to about 70 percent, and preferably from about 30 percent to about 60 percent of its vinyl acetate groups hydrolyzed to form vinyl alcohol groups, is prepared at an elevated dissolution temperature which is suitably above about 70° C. and preferably from about 75° C. to about 100° C. The produced solution is then ready to receive the core material to be dispersed therein. Preferably, the solution is allowed to cool to a dispersion temperature of about 30° C. to about 65° C. A previously prepared aqueous solution of the acid addition salt of the tobacco alkaloid, e.g., nicotine citrate, preferably containing an excess of citric acid, is then added to the HEVA-toluene solution with vigorous agitation so as to disperse the aqueous solution as minute droplets of core material within the HEVA-toluene solution.

Next, liquid-liquid phase separation of the HEVA copolymer from the toluene solution thereof is induced by adding a phase separation inducer, such as cottonseed oil, and then cooling the resulting admixture to a phase-separation temperature in the range from about 15° C. to about 50° C., and preferably from about 20° C. to about 30° C., while continuing the agitation to maintain the dispersed core material droplets in suspension. However, the phase separation inducer can also be added earlier, i.e., before the core material. When phase separation is induced within the system, the wall-forming HEVA copolymer material separates out as another discontinuous phase, i.e., a third phase, that preferentially wets the capsule core material entities and forms a sheath or an embryonic capsule wall. This third phase is a relatively concentrated solution or gel of the polymeric base material, is more viscous than the continuous phase, and in addition, is of sufficiently high viscosity to maintain a substantially continuous sheath around the discrete capsule core material entities in the system despite the shearing forces incident to the forces required to maintain these entities in dispersion.

Next, a solution of a cross-linking agent, such as toluene diisocyanate (TDI) adducted with trimethylol propane in toluene, is added to the cooled admixture to cross-link, and thus to harden, the HEVA sheath which is deposited about the core material as a result of the aforesaid addition of the phase-separation inducing cottonseed oil. After TDI addition, the produced admixture is further cooled to a temperature in the range of about 0° C. to about 20° C. and is then permitted to warm to ambient temperature while being continuously agitated. Agitation is continued until cross-linking is completed. Thereafter, the produced microcapsules are recovered, washed, and dried in air or preferably under vacuum to a freely flowing consistency. Vacuum drying is preferred because in some instances it is desirable to increase the concentration of the solute or solutes in the aqueous core material. Prolonged drying under vacuum will permit some of the water to diffuse out through the microcapsule wall.

The present invention is further illustrated by the following examples.

EXAMPLE 1

Nicotine (25 grams) and citric acid (37.5 grams) were combined in 37.5 grams of water to produce an aqueous solution containing the citric acid addition salt of nicotine.

A solution of 2.5-weight percent of a hydrolyzed ethylene-vinyl acetate copolymer containing 40-weight percent vinyl acetate with 48.3 percent of the vinyl acetate groups hydrolyzed to vinyl alcohol groups in toluene was prepared at elevated temperatures between 80 and 85° C. and then cooled to about 60° C. At that time the aqueous solution containing the citric acid addition salt of nicotine was added to the solution of the hydrolyzed ethylene-vinyl acetate copolymer in toluene with vigorous agitation so as to disperse the aqueous, citric acid addition salt of nicotine-containing solution as minute droplets within the toluene solution. At about the same time, cottonseed oil was added to the toluene solution (in an amount sufficient to form an 11-weight percent solution of cottonseed oil) to induce liquid-liquid phase separation. The produced admixture was then cooled to about 22° C. while agitated sufficiently to maintain the dispersed core material droplets in suspension.

A solution of toluene diisocyanate (TDI) adducted with trimethylol propane in toluene was then added to the cooled admixture to cross-link, and thus to harden, the HEVA sheath that was deposited about the core material as a result of the aforesaid addition of cottonseed oil. After TDI addition, the produced admixture was further cooled to about 5° C. and then was permitted to warm to ambient temperature while continually being agitated. Agitation was continued until cross-linking was completed. Thereafter, the produced microcapsules were recovered by filtration, washed with toluene, and dried in air or under vacuum to a freely flowing consistency. The average size of the produced microcapsules was about 150 microns.

EXAMPLE 2

The process of Example 1 was successfully repeated using an HEVA copolymer having 44.7 percent of its acetate groups hydrolyzed to form alcohol groups.

EXAMPLE 3

The process of Example 1 was successfully repeated using an HEVA copolymer having 41.8 percent of its acetate groups hydrolyzed to form alcohol groups.

EXAMPLE 4

The process of Example 1 was successfully repeated using an HEVA copolymer having 35.2 percent of its acetate groups hydrolyzed to form alcohol groups.

EXAMPLE 5

Nicotine (95 percent pure, 38.6 grams) and ortho-phosphoric acid (85 percent solution, 17.5 milliliters) were combined in water (55 milliliters) to produce an aqueous solution containing nicotine ortho-phosphate together with free ortho-phosphoric acid.

A solution of hydrolyzed ethylene-vinyl acetate copolymer (about 10 grams; containing about 39 to 42 weight percent vinyl acetate, 40 to 42 percent hydrolyzed) in toluene (about 400 milliliters) was prepared by dissolving the copolymer in toluene at about 95° C. with stirring for about 15 minutes. Cottonseed oil (about 50 ml.) was then added to the prepared solution and the solution cooled to about 58° C.

Thereafter the nicotine acid addition salt-containing aqueous solution was dispersed into the toluene solution with agitation so as to produce droplets having a size of about 140 microns and less. The produced dispersion was cooled to about 35° C. while being agitated, and then a solution of TDI adducted with trimethylol propane (about 5.5 grams) in toluene (about 30 milliliters) was added over a time period of about three minutes thereto while the produced admixture was stirred and further cooled to about 22° C., and then to about 5° C. in an ice/water bath. Upon reaching this temperature, the produced dispersion was removed from the ice/water bath and permitted to warm to ambient temperature.

Agitation of the produced dispersion was continued for about 48 hours. Thereafter microcapsules having the nicotine acid addition salt-containing aqueous solution as the core material are recovered from the produced dispersion, rinsed with three changes of toluene, and filtered. The obtained filter cake of microcapsules is shaken with finely divided silica gel (Syloid 74, about 3 to 4 grams), sieved through a 250-micron sieve and dried. The dry capsules were then further classified as to size by sieving through a 177-micron sieve.

The produced, dry microcapsules having a size of less than 177 microns contained about 44-weight percent nicotine. Microcapsule wall impermeability was tested by suspending these microcapsules in water and monitoring the rate of nicotine extraction therefrom. After about 33 hours about one-half of the nicotine present was extracted from the microcapsules, i.e., the microcapsule half-life was about 33 hours.

EXAMPLE 6

Nicotine-containing microcapsules were produced in a manner similar to Example 5 but using an aqueous solution of nicotine d-tartarate. The aqueous solution was constituted by about 26.1 grams of nicotine, about 26.2 grams of d-tartaric acid, and about 40 milliliters of water.

The hydrolyzed ethylene-vinyl acetate copolymer was cross-linked using a toluene solution of TDI adducted with trimethylol propane (about 11.9 grams). The total manufacturing time was 24 hours.

The produced, dry microcapsules had a nicotine content of about 32.4-weight percent and a half-life in water of about 13.8 hours.

EXAMPLE 7

Microcapsules containing as the core material an aqueous solution of nicotine malate were produced in a manner similar to Example 6. The aqueous solution was constituted by about 23.2 grams of nicotine, about 20.8 grams of malic acid, and about 40 milliliters of water.

The produced, dry microcapsules had a nicotine content of about 31.9 weight percent and a half-life in water of about 14.8 hours.

Although this invention has been described in terms of its preferred embodiments, further variations are contemplated as being within the scope of the invention. The only limitations of this invention are defined by the appended claims.

We claim:

1. An alkaloid-containing microcapsule which comprises a core material carrying an alkaloidal material and a wall of a cross-linked, film-forming, water-impermeable polymeric material surrounding said core material wherein said core material includes a physiologically acceptable acid capable of forming an acid addition salt of the alkaloidal material, said capsule core material including an amount of said acid in excess of the stoichiometric amount necessary to form the acid addition salt, the alkaloidal material being in the form of a water-soluble acid addition salt of said acid.

2. The microcapsule in accordance with claim 1 wherein the alkaloidal material is a tobacco alkaloid.

3. The microcapsule in accordance with claim 2 wherein the tobacco alkaloid is nicotine.

4. The microcapsule in accordance with claim 2 wherein the tobacco alkaloid is anabasine.

5. The miorocapsule in accordance with claim 2 wherein the tobacco alkaloid is nornicotine.

6. The microcapsule in accordance with claim 1 wherein the acid is citric acid.

7. The microcapsule in accordance with claim 1 wherein the acid is ortho-phosphoric acid.

8. The microcapsule in accordance with claim 1 wherein the acid is d-tartaric acid.

9. The microcapsule in accordance with claim 1 wherein the acid is malic acid.

10. The microcapsule in accordance with claim 1 wherein at least about 0.1 percent stoichiometric excess of the acid is present.

11. The microcapsule in accordance with claim 1 wherein at least about 10 percent stoichiometric excess of the acid is present.

12. The microcapsule in accordance with claim 1 wherein the wall comprises cross-linked, previously partially hydrolyzed ethylene-vinyl acetate copolymer.

13. The microcapsule in accordance with claim 1 wherein the additon salt is nicotine citrate.

14. The microcapsule in accordance with claim 1 wherein the core material includes an aqueous solution of nicotine citrate and citric acid.

15. The microcapsule in accordance with claim 1 wherein the core material includes an aqueous solution of nicotine citrate and a stoichiometric excess of about 0.1 percent to about 100 percent of citric acid.

16. The microcapsule in accordance with claim 1 wherein the addition salt is nicotine ortho-phosphate.

17. The microcapsule in accordance with claim 1 wherein the core material includes an aqueous solution of nicotine ortho-phosphate and ortho-phosphoric acid.

18. The microcapsule in accordance with claim 1 wherein the core material includes an aqueous solution of nicotine ortho-phosphate and a stoichiometric excess of about 0.1 percent to about 100 percent of ortho-phosphoric acid.

19. The microcapsule in accordance with claim 1 wherein the addition salt is nicotine d-tartarate.

20. The microcapsule in accordance with claim 1 wherein the core material includes an aqueous solution of nicotine d-tartarate and d-tartaric acid.

21. The microcapsule in accordance with claim 1 wherein the core material includes an aqueous solution of nicotine d-tartarate and a stoichiometric excess of about 0.1 to about 100 percent of d-tartaric acid.

22. The microcapsule in accordance with claim 1 wherein the acid addition salt is nicotine malate.

23. The microcapsule in accordance with claim 1 wherein the core material includes an aqueous solution of nicotine malate and malic acid.

24. The microcapsule in accordance with claim 1 wherein the core material includes an aqueous solution of nicotine malate and a stoichiometric excess of about 0.1 to about 100 percent of malic acid.

25. A nicotine-containing microcapsule which comprises a capsule core material comprising an aqueous solution of an addition salt of nicotine with a physiologically acceptable acid, said capsule core material also including an amount of the same acid in free form as is present in the acid addition salt, and a protective wall of a cross-linked, film-forming, water-impermeable polymer.

26. The micropcapsule in accordance with claim 25 wherein the amount of free citric acid present in the capsule core material is present in an amount of about 0.1 to about 100 weight percent of the stoichiometric amount of citric acid that constitutes the nicotine citrate present in the capsule core material.

27. A method of producing alkaloidal material-containing microcapsules which comprises:
(1) intermixing, inter alia, (a) a film-forming, water-impermeable polymeric wall material, (b) a water-immiscible liquid vehicle capable of dissolving the polymeric wall material, and (c) an aqueous vehicle carrying an acid addition salt of a tobacco alkaloid and a physiologically acceptable acid, said acid addition salt being substantially insoluble in said liquid vehicle, said capsule core material including an amount of said acid in excess of the stoichiometric amount necessary to form said acid addition salt, said aqueous vehicle being capable of dispersion in said liquid vehicle as a plurality of individual, minute core material entities;
(2) agitating the produced admixture to disperse the alkaloidal material-carrying aqueous vehicle as individual, minute core material entities throughout the liquid vehicle having said polymeric wall material dissolved therein to form an agitated system in which the liquid vehicle constitutes a continuous phase;
(3) inducing phase separation within said agitated system to separate said polymeric wall material from said continuous phase and thereby forming sheaths of said polymeric wall material about said core material entities containing said alkaloidal material; and
(4) cross-linking said polymeric wall material in the sheaths to form protective walls around said core material entities.

28. The method in accordance with claim 27 wherein said phase separation is induced by adjusting the temperature of said liquid vehicle in said agitated system.

29. The method in accordance with claim 28 wherein said temperature is adjusted by cooling said liquid vehicle.

30. The method in accordance with claim 27 wherein said phase separation is induced by adding to the system a non-solvent for said polymeric wall material that is miscible with said liquid vehicle.

31. The method in accordance with claim 27 wherein said phase separation is induced by adding to said system a complementary polymeric material soluble in said liquid vehicle but having less affinity for said capsule core material entities than said polymeric wall material.

32. The method in accordance with claim 27 wherein phase separation is induced by lowering the system temperature.

33. The method in accordance with claim 27 wherein the tobacco alkaloid is nicotine.

34. The method in accordance with claim 27 wherein the microcapsules produced after hardening are dried.

35. The method in accordance with claim 27 wherein the microcapsules produced after hardening are dried in a vacuum.

36. The method in accordance with claim 27 wherein a portion of the water present in the aqueous vehicle ofthe core material is removed through the formed protective wall.

37. A method of producing tobacco alkaloid-containing microcapsules which comprises the steps of
(1) dissolving partially hydrolyzed ethylene-vinyl acetate copolymer in toluene at an elevated dissolution temperature,
(2) cooling the produced copolymer solution to a dispersion temperature that is lower than said dissolution temperature,
(3) dispersing an aqueous solution of an acid addition salt of nicotine, and a stoichiometric excess of the acid in free form, in the produced copolymer solution with agitation to produce minute core material entities of said aqueous solution,
(4) cooling the produced dispersion to a phase separation temperature and admixing therewith a phase separation-inducing material while the dispersion is agitated with severity sufficient to maintain the produced dispersion, the amount of the phase separation-inducing material admixed being sufficient to cause the formation of sheaths of said copolymer about said core material entities, and
(5) cross-linking the formed sheaths.

38. The method in accordance with claim 37 wherein said dissolution temperature is in the range of about 70° C. to about 100° C.

39. The method in accordance with claim 37 wherein said cross-linking is effected by adding to the agitated dispersion of sheath-clad core material entities toluene diisocyanate, cooling the resulting mixture to a temperature in the range of about 0° C. to about 20° C., and subsequently warming the mixture to ambient temperature.

40. The method in accordance with claim 37 wherein said acid addition salt is nicotine citrate.

41. The method in accordance with claim 37 wherein said aqueous solution contains nicotine citrate and free citric acid.

42. The method in accordance with claim 41 wherein the amount of free citric acid present exceeds the stoichiometric amount of citric acid necessary to form the nicotine citrate in an amount of about 0.1 to about 100 weight percent.

* * * * *

UNITED STATES PATENT AND TRADEMARK OFFICE
CERTIFICATE OF CORRECTION

PATENT NO. : 4,464,434

DATED : August 7, 1984

INVENTOR(S) : Hubert Bradley, Jr., Robert G. Bayless
Ronald L. Hart, Danny A. Davis It is certified that error appears in the above-identified patent and that said Letters Patent is hereby corrected as shown below:

[75] Inventors: - Inventors' names should read:

-- Robert G. Bayless, Yellow Springs, Ohio
Hubert Bradley, Jr., Matthews, N. C.
Ronald L. Hart, Xenia; and Danny A. Davis, Casstown, Ohio--
Title page, Item /19/, "Davis" should read --Bayless et al--

Column 5, lines 33 to 38: - The formula reading

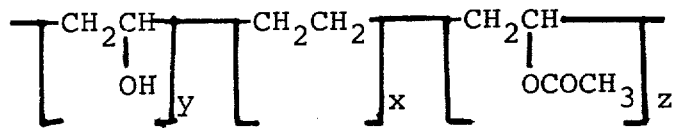

should read

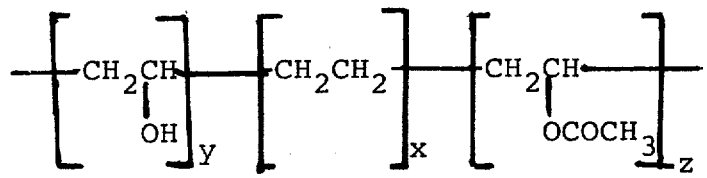

Signed and Sealed this

Nineteenth Day of March 1985

[SEAL]

Attest:

DONALD J. QUIGG

Attesting Officer     Acting Commissioner of Patents and Trademarks